United States Patent
Momose (10) Patent No.: US 12,279,068 B2
(45) Date of Patent: Apr. 15, 2025

(54) REMOTE SYSTEM

(71) Applicant: TOYOTA JIDOSHA KABUSHIKI KAISHA, Toyota (JP)

(72) Inventor: Hirofumi Momose, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 18/240,060

(22) Filed: Aug. 30, 2023

(65) Prior Publication Data

US 2024/0121351 A1    Apr. 11, 2024

(30) Foreign Application Priority Data

Oct. 6, 2022    (JP) .................................. 2022-161404

(51) Int. Cl.
*H04N 5/272*    (2006.01)
*H04N 23/66*    (2023.01)

(52) U.S. Cl.
CPC ............. *H04N 5/272* (2013.01); *H04N 23/66* (2023.01)

(58) Field of Classification Search
CPC ................................ H04N 23/66; H04N 5/272
See application file for complete search history.

(56) References Cited

U.S. PATENT DOCUMENTS

| 11,394,939 | B2 * | 7/2022 | Minami | ............... | H04N 9/3164 |
| 2017/0345118 | A1 * | 11/2017 | Witt | ............... | G06T 1/0021 |
| 2020/0244841 | A1 * | 7/2020 | Ichikawa | ............... | G06V 20/48 |
| 2024/0290247 | A1 * | 8/2024 | Nishitani | ............... | G09G 5/393 |

FOREIGN PATENT DOCUMENTS

| JP | 2011150135 A | * | 8/2011 |
| JP | 2020-180466 A | | 11/2020 |

* cited by examiner

*Primary Examiner* — Antoinette T Spinks
(74) *Attorney, Agent, or Firm* — Oliff PLC (57) ABSTRACT

The remote system includes a vehicle equipped with a camera and a remote terminal having a display. The vehicle and the remote terminal are connected via a communication network. The vehicle generates synthesized video in which moving object video changing over time is synthesized with camera video captured by the camera, and transmits the synthesized video to the remote terminal. The remote terminal displays the synthesized video on the display, detects fixation of video displayed on the display based on a change in the moving object video included in the synthesized video, and outputs an abnormality signal in response to detection of the fixation.

3 Claims, 6 Drawing Sheets

REMOTE SYSTEM

CROSS-REFERENCE TO RELATED APPLICATION

The present application claims priority under 35 U.S.C. § 119 to Japanese Patent Application No. 2022-161404, filed Oct. 6, 2022, the contents of which application are incorporated herein by reference in their entirety.

BACKGROUND

Field

The present disclosure relates to a remote system in which a vehicle and a remote terminal are connected via a communication network.

Background Art

JP2020-180466A discloses a monitoring system in which a current video acquired by a camera and a recorded past video are subjected to transmission composition so that a change between the current video and the past video can be visually recognized.

SUMMARY

The application of the above monitoring system to a remote system of a vehicle will now be considered. The vehicle remote system is a system that transmits video captured by an in-vehicle camera to a remote terminal via a communication network and displays the video on a display of the remote terminal.

In the remote system, a failure may occur in which video displayed on a display is fixed, that is, video that should originally be a moving image becomes a still image. When the fixation of the video occurs, since the current video and the past video are the same, it is meaningless to compare them. In other words, it is difficult to apply the above monitoring system to the remote system in view of the possible fixation of video in the monitoring system. In addition, the fixation of video often occurs due to disruption of a communication network. Therefore, even if the vehicle compares the current image with the past image and transmits the result to the remote terminal, it is still difficult to apply the monitoring system to the remote system.

The present disclosure has been made in view of the above problem. An object of the present disclosure is to enable a remote system of a vehicle to detect that video displayed on a display of a remote terminal is fixed and to take an appropriate measure against the fixation of the video.

The present disclosure provides a remote system for achieving the above object. The remote system of the present disclosure includes a vehicle equipped with a camera and a remote terminal having a display. The vehicle and the remote terminal are connected via a communication network. The vehicle is configured to execute generating synthesized video in which moving object video changing over time is synthesized with camera video captured by the camera, and transmitting the synthesized video to the remote terminal. The remote terminal is configured to execute displaying the synthesized video on the display, detecting fixation of video displayed on the display based on a change in the moving object video included in the synthesized video, and outputting an abnormality signal in response to detection of the fixation.

According to the remote system of the present disclosure, the display of the remote terminal displays the synthesized video in which the moving object video changing over time is synthesized with the camera video captured by the camera. When the synthesized video displayed on the display is fixed, the moving object video which should have changed over time does not change. Therefore, it is possible to detect that the video is fixed based on a change in the moving object video. According to the remote system of the present disclosure, since the abnormality signal is output in response to the detection of the fixation of the video, it is also possible to take an appropriate measure against the fixation of the video.

DETAILED DESCRIPTION

Hereinafter, embodiments of a remote system of the present disclosure will be described with reference to the drawings. The remote system includes a remote monitoring system, a remote assistance system, and a remote driving system. The remote monitoring system is a system configured to allow a remote operator to monitor video transmitted from an in-vehicle camera. The video to be monitored includes video of the surroundings of the vehicle including the traveling direction of the vehicle and video of the inside of the vehicle showing the state of the occupant. A vehicle to which the remote monitoring system is applied includes a manually driven vehicle driven by a driver in the vehicle and an autonomous driving vehicle driven by an autonomous driving system. The remote support system is a system configured such that an autonomous driving vehicle that encounters a scene in which it is difficult to determine an action requests support from a remote operator and can act in accordance with an instruction from the remote operator. The remote driving system is a system configured to allow a remote operator to remotely drive the vehicle. The remote system of the present disclosure is applicable to any of a remote monitoring system, a remote support system, and a remote driving system.

1. First Embodiment

1-1. Configuration of Remote System

Figure 1:
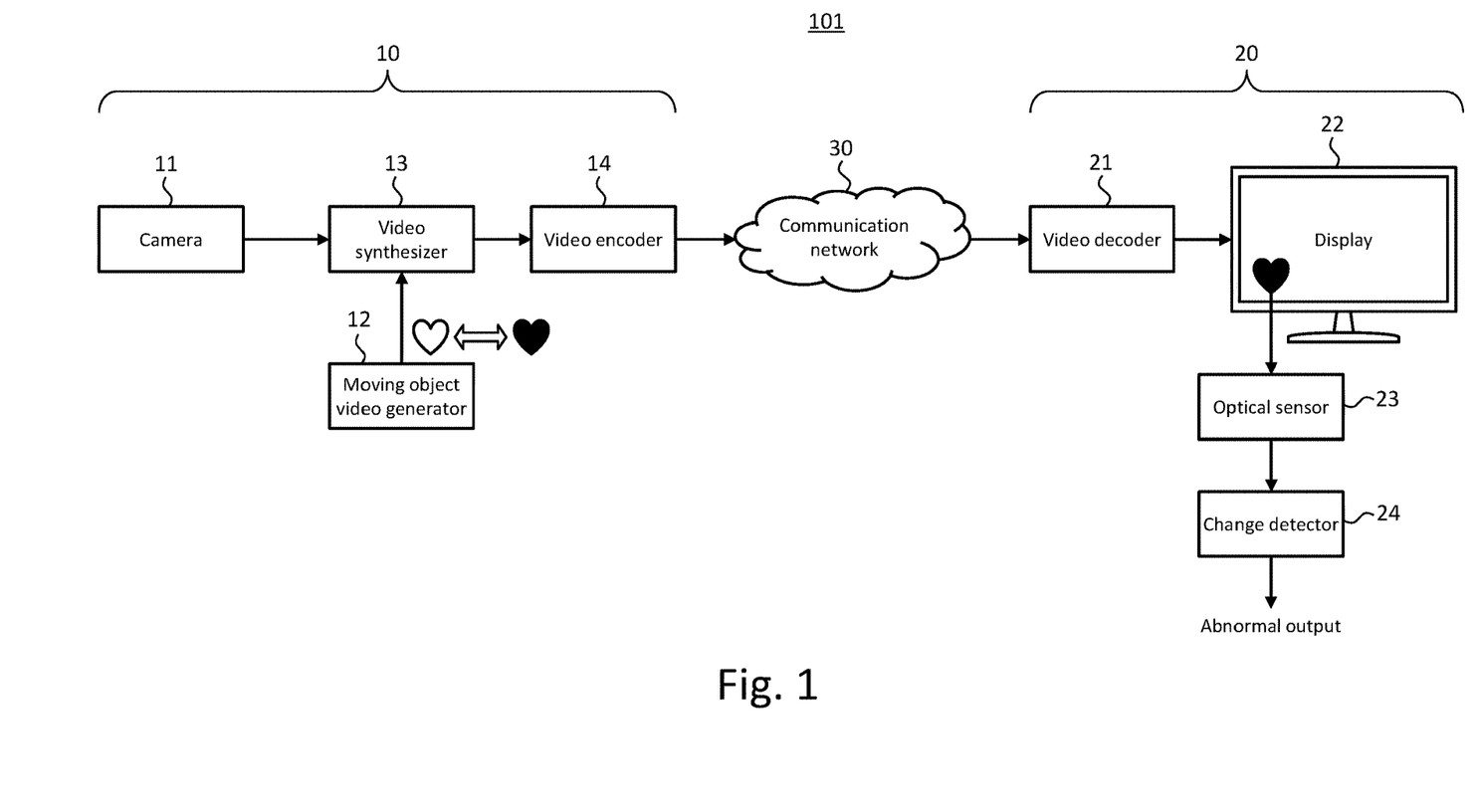
FIG. 1 is a diagram illustrating a configuration of a remote system according to a first embodiment.

FIG. 1 is a diagram illustrating a configuration of a remote system 101 according to a first embodiment of the present disclosure. The remote system 101 is a system in which the vehicle 10 and the remote terminal 20 are connected via the communication network 30. The vehicles 10 are configured to connect to the communication network 30 by mobile communication such as LTE or 5G. The remote terminal 20 is an operation terminal operated by a remote operator. When the remote system 101 is a remote driving system or a remote assistance system, the remote terminal 20 is also referred to as a remote cockpit. The communication network 30 may include one or more servers. That is, the communication between the vehicle 10 and the remote terminal 20 may be performed directly or via the server.

The vehicle 10 is equipped with a camera 11, a moving object video generator 12, a video synthesizer 13, and a video encoder 14. The camera 11 is an external camera that is directed toward the outside of the vehicle 10 and captures video f the surroundings of the vehicle 10 including the traveling direction. However, in a case where an in-vehicle camera that is directed toward the inside of the vehicle 10 and captures a state of an occupant in the vehicle is mounted on the vehicle 10, the in-vehicle camera may be included in the camera 11. That is, the camera 11 represents various cameras mounted on the vehicle 10.

The moving object video generator 12, the video synthesizer 13, and the video encoder 14 may be physically configured circuits, or may be a program operating on an on-vehicle computer. The moving object video generator 12 is configured to generate a moving object video that changes over time. The video synthesizer 13 is configured to synthesize the moving object video generated by the moving object video generator 12 with the camera video captured by the camera 11. The video encoder 14 is configured to encode a synthesized video in which the moving object video is synthesized with the camera video, and transmit the encoded synthesized video to the remote terminal 20. The transmission of the video from the vehicle 10 to the remote terminal 20 may be performed at all times or may be performed only for a predetermined period.

The remote terminal 20 comprises a video decoder 21, a display 22, a light sensor 23 and a change detector 24. The video decoder 21 is configured to decode the synthesized video transmitted from the vehicle 10 and to display the decoded synthesized video on the display 22. The display 22 may have a plurality of screens according to the number of cameras 11, or may display a plurality of videos side by side on one screen. The optical sensor 23 is attached to the screen of the display 22, and is configured to extract, as a signal, a change in the moving object video included in the synthesized video displayed on the display 22. The change detector 24 is configured to detect fixation of a video displayed on the display 22 from a signal output from the optical sensor 23. The change detector 24 outputs an abnormal signal in response to the detection of the fixation of the video. It should be noted that the video decoder 21 and the change detector 24 may be physically configured circuits or may be programs operating on a computer.

1-2. Method for Generating Synthesized Video and Method for Detecting Fixation of Video Next, a method of generating a synthesized video and a method of detecting fixation of a video in the remote system 101 will be specifically described with reference to the drawings.

Figure 2:
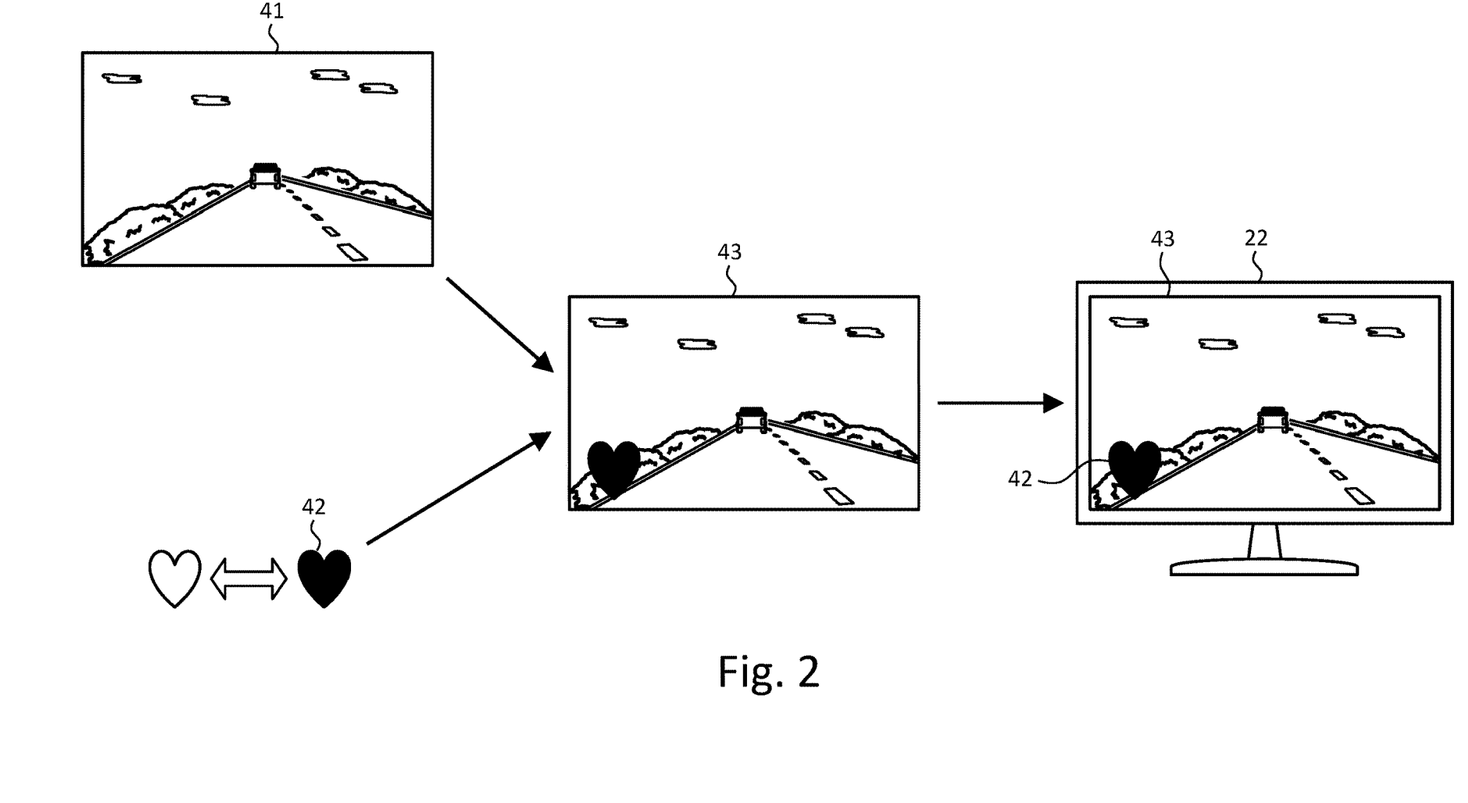
FIG. 2 is a diagram showing a specific example of a method of generating synthesized video in which moving object video is synthesized with camera video.

FIG. 2 is a diagram showing a specific example of a method of generating the synthesized video 43. As shown in FIG. 2, the moving object video 42 is synthesized with the camera video 41 to generate synthesized video 43. The moving object video 42 is a video of a moving object in which a visual change occurs over time. The visual change includes, for example, a change in brightness, a change in color, and a change in shape. The change over time includes, for example, a change at a constant frequency and a change at random timing. As a typical moving object video 42, a video of a moving object in which a brightness state is switched at a constant frequency, for example, a video of a lamp blinking at a constant frequency can be exemplified. However, the frequency of the change in the moving object video 42 is lower than the frame rate of the camera video 41.

The size of the moving object video 42 is adjusted to be sufficiently smaller than that of the camera video 41 so as not to reduce the amount of information obtained from the camera video 41. In addition, the position where the synthesized video 43 is synthesized with the camera video 41 is fixed. When the synthesized video 43 is displayed on the display 22, the moving object video 42 is synthesized with the camera video 41 so that the moving object video 42 is located at a position far from the center of the screen of the display 22, typically at a corner of the screen. By setting the position of the moving object video 42 to the corner of the screen, it is possible to prevent the concentration of the remote driver on the video (camera video) from being inhibited.

Figure 3:
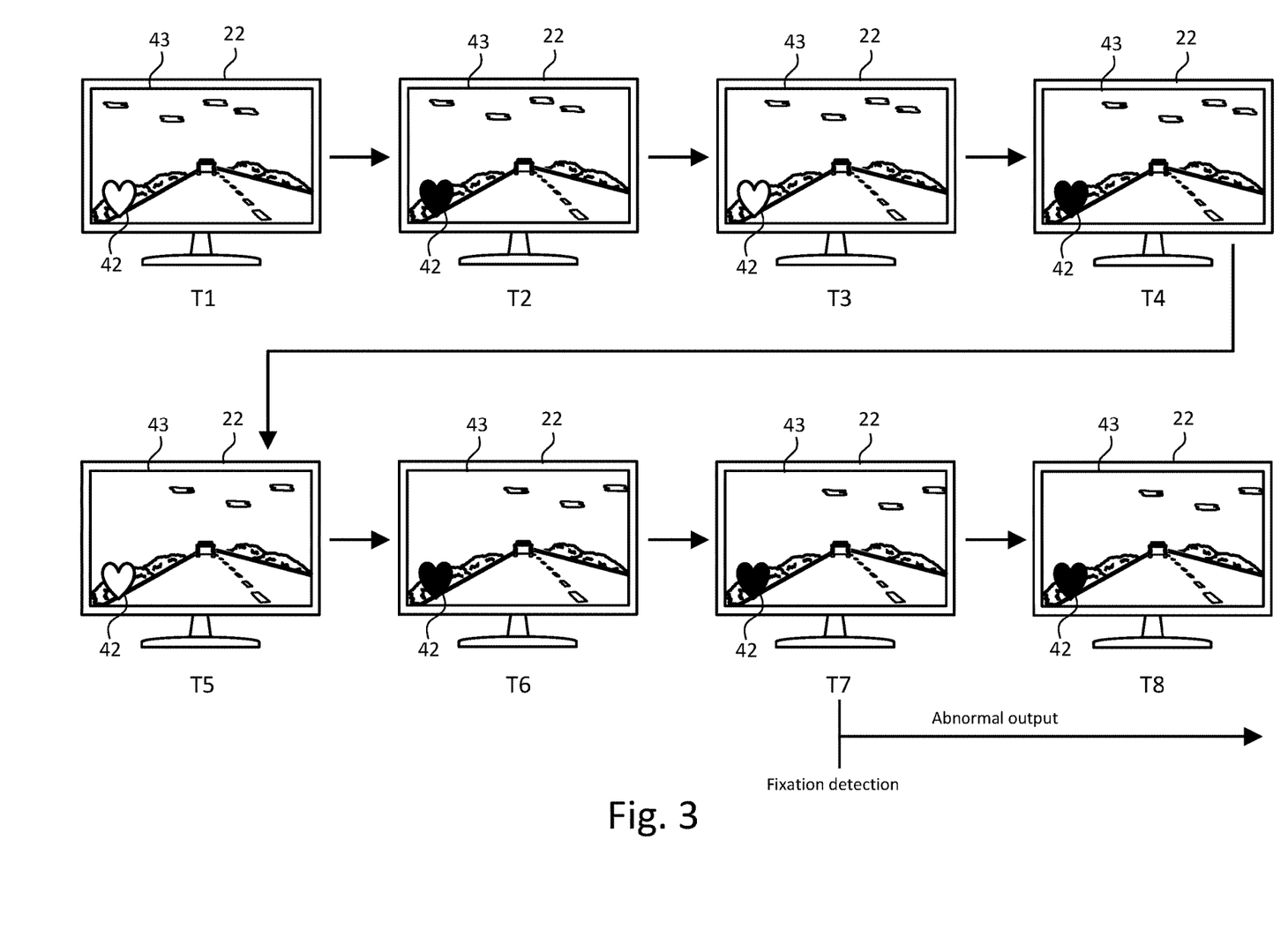
FIG. 3 is a diagram showing a specific example of a method for detecting fixation of video based on a change in moving object video.

FIG. 3 is a diagram showing a method of detecting fixation of a video based on a change in the moving object video 42 displayed on the display 22. The synthesized video 43 including the moving object video 42 is displayed on the display 22. The camera video constituting the synthesized video 43 changes in accordance with a change over time of the object being captured by the camera 11. On the other hand, the moving object video 42 regularly changes at a constant frequency. T1, T2, T3, T4, T5, T6, T7, and T8 shown in FIG. 3 are times at which the blinking of the lamp as the moving object video 42 is to be switched, and the intervals between the times are constant.

In the example shown in FIG. 3, the lamp is bright (on) at time T1, dark (off) at time T2, bright at time T3, dark at time T4, bright at time T5, and dark at time T6. If such a cycle were to switch between bright and dark, the lamp would be bright at time T7. However, in the example shown in FIG. 3, the lamp is dark at time T7 and is also dark at time T8. This means that the moving object video 42 is not switched, that is, the synthesized video 43 including the moving object video 42 is fixed. It can be determined that the video is fixed after time T7. Therefore, the abnormality signal is output at a timing after the time T7 at which the fixation of the video is detected. By outputting the abnormal signal in response to the detection of the fixation of the video, it is possible to take appropriate measures against the fixation of the video.

1-3. Application Example

Next, an application example in which an emergency stop function is added to the above-described remote system 101 will be described with reference to FIG. 4. However, in FIG. 4, elements that are identical in function to elements shown in FIG. 1 are labeled with the same reference numerals, and description of those elements is omitted or simplified.

Figure 4:
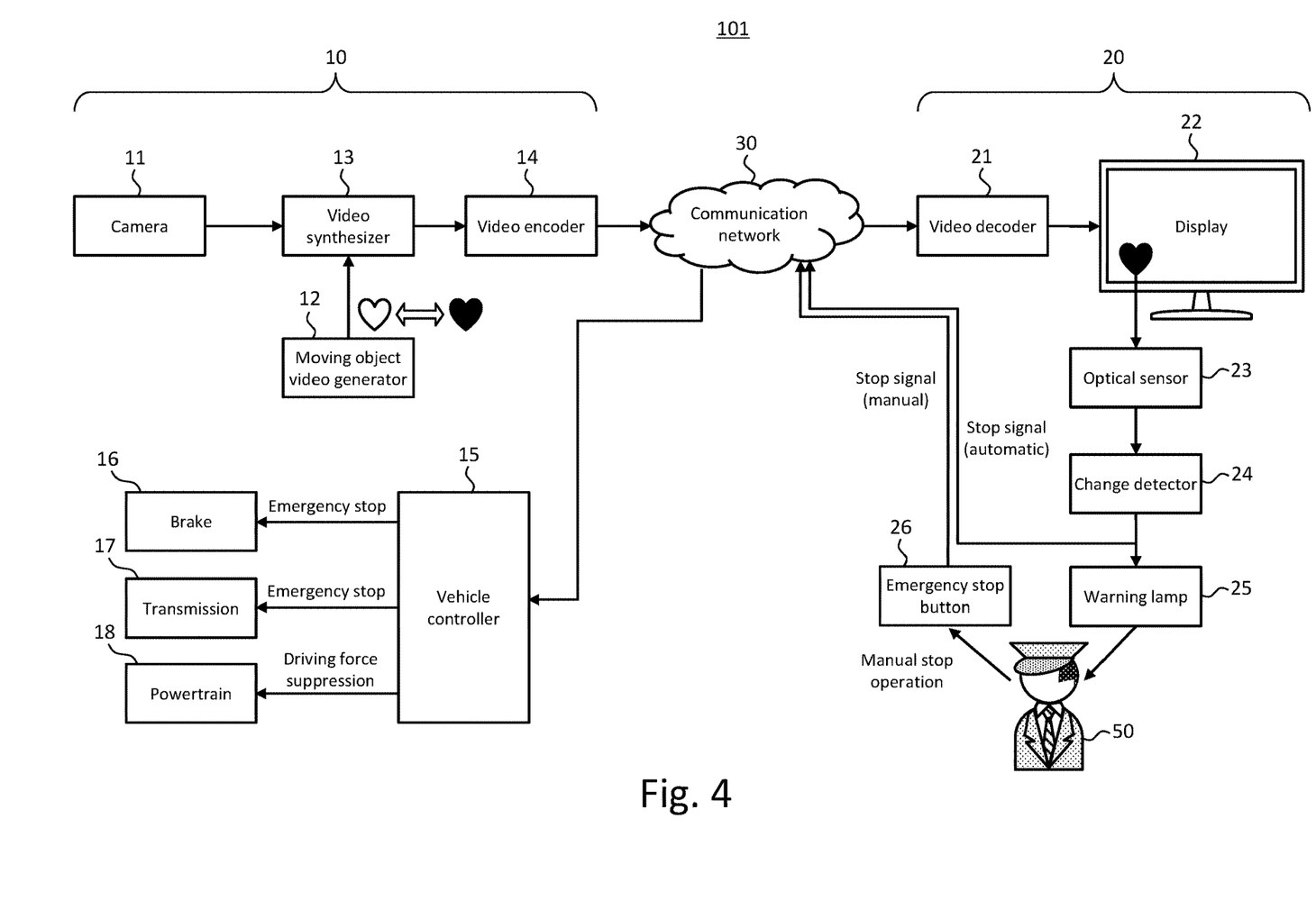
FIG. 4 is a diagram showing an application example of a remote system according to a first embodiment.

In the application example shown in FIG. 4, the abnormality signal output from the change detector 24 is used as a stop signal for automatically stopping the vehicle 10. Alternatively, the abnormality signal output from the change detector 24 is used as a stop signal for turning on the warning lamp 25. In the latter case, when the remote operator 50 who sees the lighting of the warning lamp 25 presses the emergency stop button 26, a stop signal is output from the emergency stop button 26. That is, the remote system 101 may be configured to automatically output the stop signal or may be configured to output the stop signal in response to a manual stop operation by the remote operator 50.

The stop signal is transmitted to the vehicle controller 15 mounted on the vehicle 10 via the communication network 30. Since the bit information of the stop signal is small, it is possible to transmit the stop signal even in a state where the transmission of the video is delayed as long as the fixation of the video is not caused by the interruption of the communication network. The vehicle controller 15 receiving the stop signal operates the brake 16 to suppress the start of the vehicle 10, and operates the brake 16 to decelerate and stop the vehicle 10 if the vehicle 10 is traveling. At the same time, the vehicle controller 15 controls the power train 18 to suppress the driving force, and after the vehicle is stopped, the transmission 17 is placed in the parking position to maintain the stopped state.

2. Second Embodiment

Figure 5:
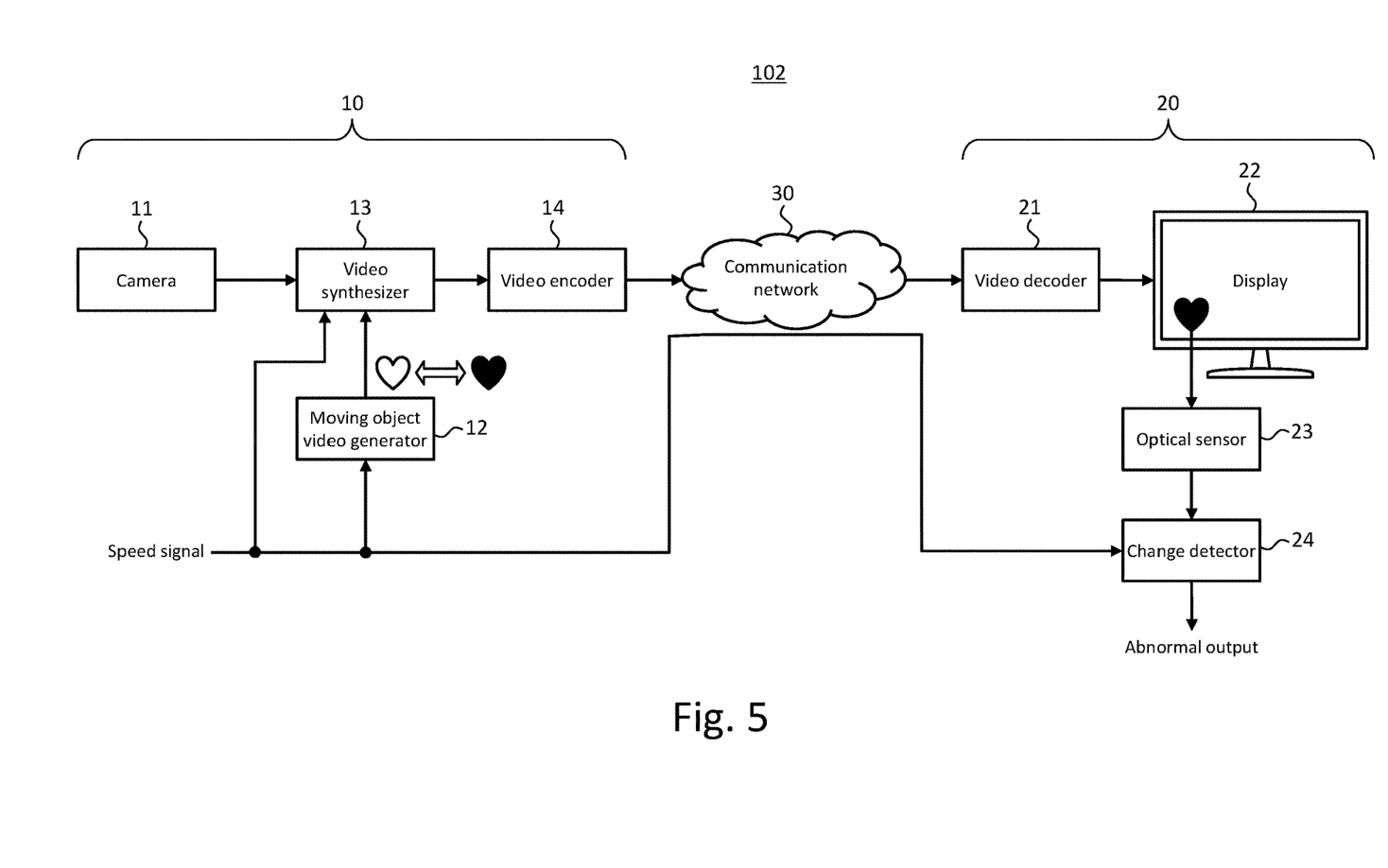
FIG. 5 is a diagram showing a configuration of a remote system according to a second embodiment.

FIG. 5 is a diagram illustrating a configuration of a remote system 102 according to the second embodiment of the present disclosure. However, in FIG. 5, elements that are identical in function to elements shown in FIG. 1 are labeled with the same reference numerals, and description of those elements is omitted or simplified.

In the remote system 102, a velocity signal output from a velocity sensor (not shown) is input to the moving object video generator 12 and the video synthesizer 13. The moving object video generator 12 determines the stop of the vehicle 10 from the speed signal, and generates the moving object video only when the vehicle 10 stops. The video synthesizer 13 determines the stop of the vehicle 10 from the speed signal, and synthesizes the moving object video with the camera video only when the vehicle 10 stops. That is, in the remote system 102, the synthesized video in which the moving object video is synthesized is generated only when the vehicle 10 is stopped.

In the remote system 102, the speed signal is transmitted from the vehicle 10 to the remote terminal 20 together with the video. The video transmitted from the vehicle 10 to the remote terminal 20 is a synthesized video in which the moving object video is synthesized while the vehicle 10 is stopped, but is a camera video while the vehicle 10 is traveling. Therefore, the synthesized video is displayed on the display 22 only when the vehicle 10 is stopped, and only the camera video is displayed when the vehicle 10 is traveling. The speed signal is input to a change detector 24. The change detector 24 determines the stop of the vehicle 10 from the speed signal, and detects the fixation of the video from the signal output from the optical sensor 23 only when the vehicle 10 stops.

The problem caused by the fixation of the video is remarkable when the vehicle 10 is stopped with little change in the field of view of the camera 11. If the function of detecting fixation of a video is activated only when the vehicle 10 is stopped, generation of a moving object video during traveling is omitted, and thus a processing load in the vehicle 10 is reduced. Furthermore, since the moving object video accompanied by a change such as blinking is not displayed on the display 22 during traveling, the concentration of the remote operator 50 on the video (camera video) is prevented from being inhibited.

3. Other Embodiments

In the first embodiment and the second embodiment, the moving object video is synthesized with the camera video at the subsequent stage of the camera 11. However, as in the third embodiment and the fourth embodiment described below, the synthesizing of the moving object video can be performed inside the camera 11.

Figure 6A:
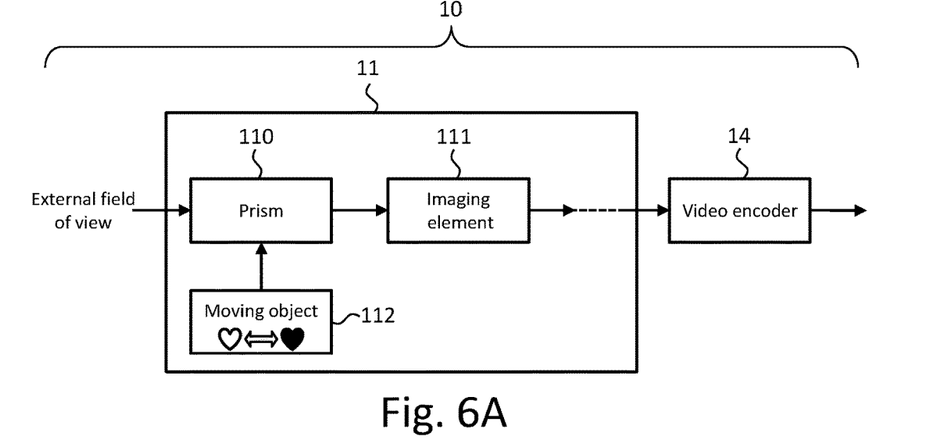
FIG. 6A is a diagram showing a configuration of a camera according to a third embodiment.

In the third embodiment, an optical system is adopted as a system for synthesizing a moving object video inside the camera 11. FIG. 6A is a diagram showing a configuration of a camera 11 according to the third embodiment. As shown in FIG. 6A, a prism 110 is disposed in front of the video sensor 111 inside the camera 11. Light from a moving object 112 provided in the camera 11 is input to the prism 110 together with light from the external field of view of the camera 11. The moving object 112 is, for example, a lamp that blinks at a constant frequency. The light from the moving object 112 is projected onto the video sensor 111 from the prism 110 together with the light from the external visual field. As a result, synthesized video in which the video of the moving object 112 is synthesized is obtained inside the camera 11. The synthesized video output from the camera 11 is encoded by the video encoder 14 and transmitted to the remote terminal 20 via the communication network 30. According to such a configuration, not only the communication network 30 but also signal processing in the imaging element 111 and the camera 11 can be collectively targeted for alive monitoring. Note that in the configuration shown in FIG. 6A, a half mirror may be provided instead of the prism 110 as a tool for projecting light from the moving object 112 onto the video sensor 111.

Figure 6B:
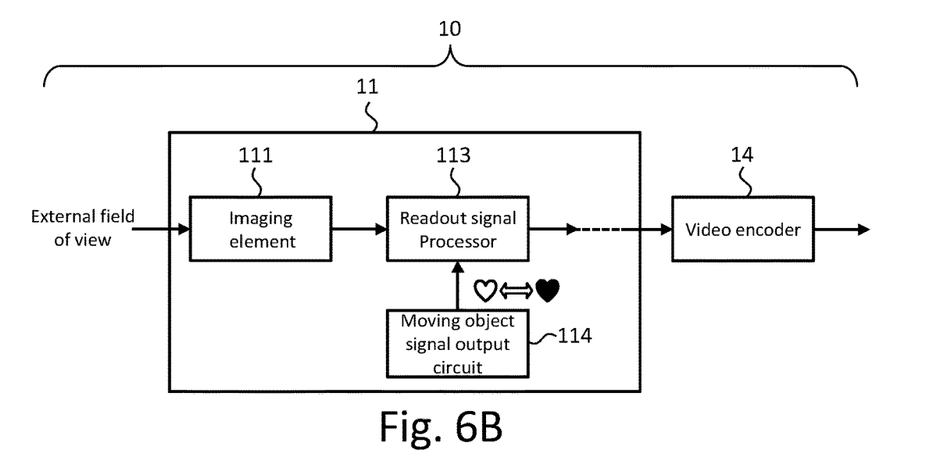
FIG. 6B is a diagram showing a configuration of a camera according to a fourth embodiment.

In the fourth embodiment, an electrical method is adopted as a method of synthesizing a moving object video inside the camera 11. FIG. 6B is a diagram showing a configuration of a camera 11 according to the fourth embodiment. As shown in FIG. 6B, a read signal processor 113 is disposed in the subsequent stage of the video sensor 111 inside the camera 11. To the read signal processor 113, a moving object signal from a moving object signal output circuit 114 provided in the camera 11 is input together with a read signal read from the video sensor 111.

The moving object signal output circuit 114 outputs a moving object signal that changes over time, for example, a signal that flashes at a constant frequency imitating a lamp. The read signal processor 113 superimposes the moving object signal on the read signal read from the video sensor 111. As a result, a synthesized video in which the moving object video is synthesized is obtained inside the camera 11. The synthesized video output from the camera 11 is encoded by the video encoder 14 and transmitted to the remote terminal 20 via the communication network 30.

In the first embodiment and the second embodiment, the optical sensor 23 is attached to the screen of the display 22 to detect the change in the moving object video. However, as in a fifth embodiment described below, the change in the moving object video can be detected directly from the video itself.

Figure 6C:
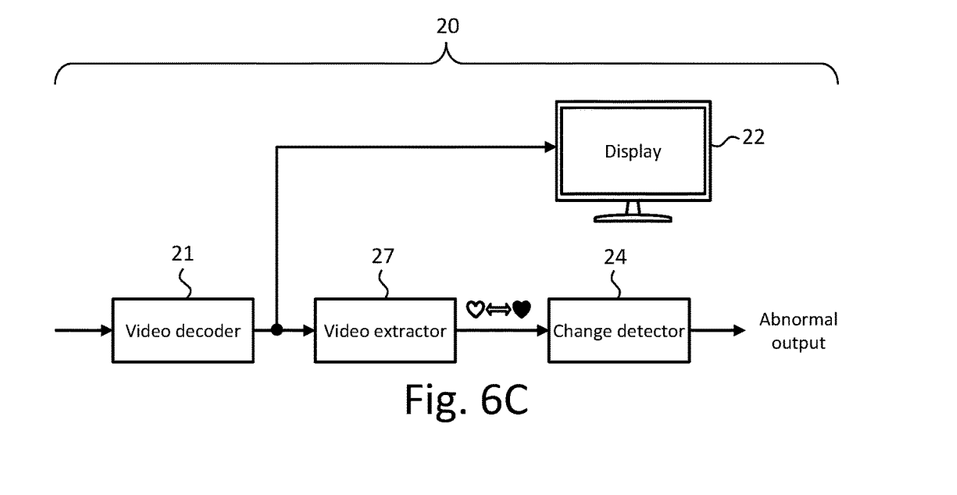
FIG. 6C is a diagram showing a configuration of a remote terminal according to a fifth embodiment.

FIG. 6C is a diagram showing a configuration of the remote terminals 20 according to the fifth embodiment. As shown in FIG. 6C, the synthesized video decoded by the video decoder 21 is input to the video extractor 27 in parallel with the display unit 22. The video extractor 27 is configured to extract the moving object video included in the synthesized video from the synthesized video. The moving video extracted by the video extractor 27 is input to the change detector 24. When there is no change in the clipped moving object video, it can be determined that the synthesized video including the moving object video is fixed. The change detector 24 is configured to detect the fixation of the video from the signal output from the video extractor 27. A change detector 24 outputs an abnormal signal in response to the detection of the fixation of the video. In the configuration shown in FIG. 6C, instead of the synthesized video decoded by the video decoder 21, a video obtained by removing the moving object video from the synthesized video in the video extractor 27 may be input to the display apparatus 22. The configuration of the remote terminal 20 according to the fifth embodiment can be synthesized with the third embodiment or can be synthesized with the fourth embodiment.

What is claimed is:

1. A remote system comprising:
   a vehicle equipped with a camera; and
   a remote terminal having a display,
   wherein the vehicle and the remote terminal are connected via a communication network,
   the vehicle is configured to execute
     generating synthesized video in which moving object video changing over time is synthesized with camera video captured by the camera, by projecting a moving object changing over time onto an imaging element of the camera, and
     transmitting the synthesized video to the remote terminal, and
   the remote terminal is configured to execute
     displaying the synthesized video on the display,
     detecting fixation of video displayed on the display based on a change in the moving object video included in the synthesized video, and
     outputting an abnormality signal in response to detection of the fixation.

2. The remote system according to claim 1, wherein the vehicle is configured to execute the generating the synthesized video when the vehicle is stopped.

3. The remote system according to claim 1, wherein the remote terminal is configured to extract the moving object video from the synthesized video and detect a change in the extracted moving object video.

* * * * *